(12) United States Patent
Kim et al.

(10) Patent No.: US 11,859,343 B2
(45) Date of Patent: Jan. 2, 2024

(54) RESIN COMPOSITION FOR PREVENTING FIBERS FROM UNRAVELING

(71) Applicant: THE A STORY CO. LTD., Seoul (KR)

(72) Inventors: Jong Sung Kim, Seoul (KR); Sun A Kang, Seoul (KR)

( * ) Notice: Subject to any disclaimer, the term of this patent is extended or adjusted under 35 U.S.C. 154(b) by 568 days.

(21) Appl. No.: 17/188,029

(22) Filed: Mar. 1, 2021

(65) Prior Publication Data

US 2021/0372041 A1    Dec. 2, 2021

(30) Foreign Application Priority Data

Jun. 2, 2020    (KR) .................. 10-2020-0066651

(51) Int. Cl.

| | |
|---|---|
| C08F 20/56 | (2006.01) |
| C08G 18/38 | (2006.01) |
| C08K 5/09 | (2006.01) |
| C08K 5/19 | (2006.01) |
| D06M 15/59 | (2006.01) |
| C08K 5/00 | (2006.01) |
| C08K 5/06 | (2006.01) |
| C08K 5/07 | (2006.01) |
| D06M 15/564 | (2006.01) |

(52) U.S. Cl.
CPC ............. *D06M 15/59* (2013.01); *C08F 20/56* (2013.01); *C08G 18/3831* (2013.01); *C08K 5/0075* (2013.01); *C08K 5/06* (2013.01); *C08K 5/07* (2013.01); *C08K 5/09* (2013.01); *C08K 5/19* (2013.01); *D06M 15/564* (2013.01); *D06M 2200/00* (2013.01)

(58) Field of Classification Search
CPC . C08F 20/56; C07L 75/04; C08K 5/09; C08K 5/19
See application file for complete search history.

(56) References Cited

FOREIGN PATENT DOCUMENTS

| | | | |
|---|---|---|---|
| CN | 110358457 A | * | 10/2019 |
| JP | H06-116870 A | | 4/1994 |
| JP | 2004182791 A | * | 7/2004 |
| KR | 10-2005-0037921 A | | 4/2005 |
| KR | 10-2015-0066075 A | | 6/2015 |
| KR | 10-2019-0027455 A | | 3/2019 |

OTHER PUBLICATIONS

Machine translation of JP2004182791, publication data Jul. 2004.*
Machine translation of CN110358457, publication date Nov. 2019.*
Machine translation of 20190027455, publication date Mar. 15, 2019.*

* cited by examiner

*Primary Examiner* — Jun Li
(74) *Attorney, Agent, or Firm* — KORUS Patent, LLC; Seong Il Jeong

(57) ABSTRACT

A resin composition for preventing fibers from unraveling according to the present invention comprises ethyl acrylate; poly acrylic amide; poly urethane; methyl acrylate; formaldehyde; antistatic agent; quaternary ammonium; maleic anhydride, and surfactant.

2 Claims, 5 Drawing Sheets

RESIN COMPOSITION FOR PREVENTING FIBERS FROM UNRAVELING

FIELD OF THE INVENTION

The present invention relates generally to a resin composition for preventing fibers from unraveling, and more specifically to a resin composition for preventing fibers from unraveling using a resin comprising a thermosetting composite resin compound.

BACKGROUND OF THE INVENTION

In general, when fibers are used to manufacture clothing, a seamstress sews imaginary lines, the edges of a sleeve, and others to prevent the fibers from unravelling at the finish.

However, when the seamstress finishes with sewing, there are problems that the quality of the sewing is poor or the seamstress is not good at the task, which deteriorate the quality of final products.

Although a variety of sewing methods have been developed and utilized to solve these problems, an issue of fiber unravelling has not been resolved yet.

In addition, a previously used sewing method of stitching clothing multiple times with threads may cause the clothing thick. Furthermore, in case of outdoor clothing, when the clothing is used in backpacks, pressure may focus on the sewing lines.

Moreover, while previous sportwear and outdoor clothing usually contain seam sealing tapes attached on the sewing lines to improve waterproof performance, there are limitations that waterproof performance of these sportwear and outdoor clothing only rely upon the seam sealing tapes.

The related prior arts may be Korean Patent Registration No. 10-1293456 and Korean Patent Publication No. 10-2018-0103641.

SUMMARY OF THE INVENTION

A resin composition for preventing fibers from unraveling according to the present invention comprises ethyl acrylate; poly acrylic amide; poly urethane; methyl acrylate; formaldehyde; antistatic agent; quaternary ammonium; maleic anhydride, and surfactant.

The resin composition comprises from about 20 weight % to about 30 weight % of the ethyl acrylate; from about 30 weight % to about 40 weight % of the poly acrylic amide; from about 15 weight % to about 16 weight % of the poly urethane; from about 13 weight % to about 32 weight % of the methyl acrylate; from about 2 weight % to about 3 weight % of the formaldehyde; from about 0.3 owf % to about 0.5 owf % of the antistatic agent; from about 0.1 owf % to about 0.2 owf % of the quaternary ammonium; from about 0.05 owf % to about 0.1 owf % of the maleic anhydride, and from about 0.2 owf % to about 0.3 owf % of the surfactant.

The antistatic agent contains polyethylene glycol ester. It is found that the 0.5 owf % or more of the antistatic agent causes migration phenomenon and deteriorates the antistatic effect.

It is found that this phenomenon occurs differently in synthetic fibers and natural fibers. When the natural fibers have static electricity, the result was totally different. However, the antistatic agent of the present invention only applies to synthetic fibers.

The quaternary ammonium comprises the Cationic Amine about 30% based on total weight of the quaternary ammonium, cation about 20%, ethylene oxide Tween about 12%, Antistatic (E.I. Du Pont de Nemours) about 38%.

The thermosetting resin composition has properties of from about 80,000 to about 120,000 cps of viscosity at $(30\pm1)°$ C., from about 34% to about 52% of solid content, from about 5 kgf/cm$^2$ to about 20 kgf/cm$^2$ of 100% modulus, from about 100 kgf/cm$^2$ to about 500 kgf/cm$^2$ of tensile strength, and from about 800% to about 2,000% of elongation.

A resin composition for preventing fibers from unraveling provided in the present invention is a resin composition which can be used to directly coat fibers and has effect that the fibers are not unraveled without seam finishes. Thus, it makes it possible to create clothing of a new sensibility, which does not need seam finishes, and can provide advantages that clothing of a new trend can be created through the innovative design.

In addition, fibers on which the resin composition is applied according to the present invention are not unraveled through the adhesive property of the resin, which can reduce the sewing cost. It also can be applied to seamless technologies which can create clothing of a new sensibility.

DETAILED DESCRIPTION EMBODIMENTS OF THE INVENTIONS

Figure 1:
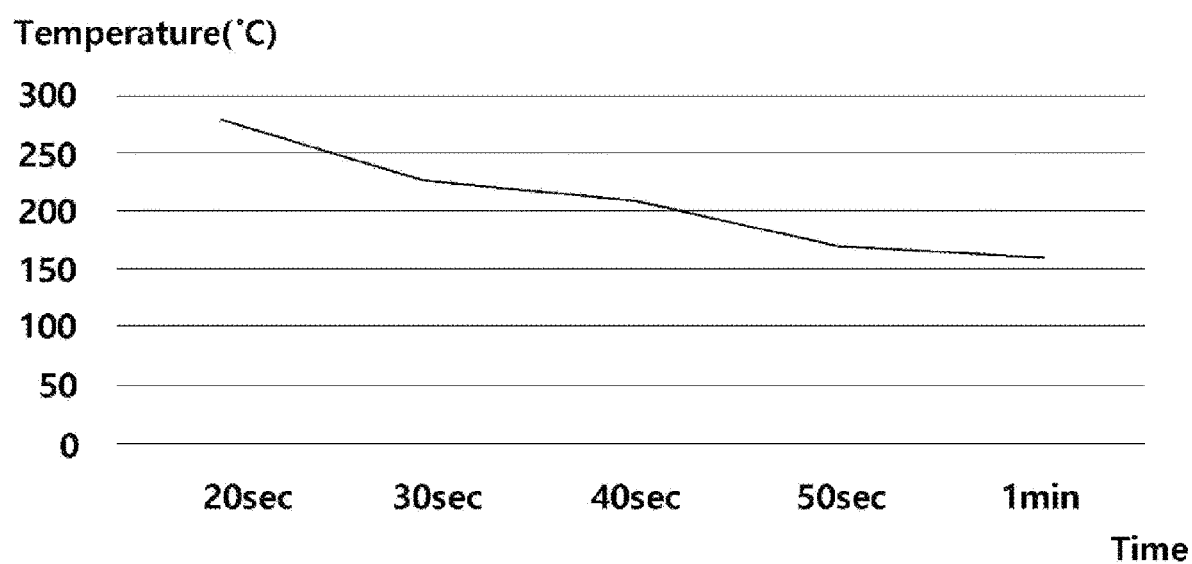
FIG. 1 is a graph showing the test results of thermosetting phenomenon of a resin composition by tenter dryer temperature and heat according to one embodiment of the present invention.

Hereafter, the present invention will be described in more detail.

The present invention relates to a resin composition for preventing fibers from unraveling, and more specifically, a purpose of the invention is to provide a resin composition which can permanently prevent fibers from unraveling using a resin comprising thermosetting composite resin compound. More particularly, the purpose of the present invention is to provide a resin composition for preventing fibers from unraveling, which has advantages that it is manufactured without seam finishes and a seamstress through using coating the resin composition on fibers.

In order to achieve the goal above, the inventors of the present invention found that permanent prevention of fiber unraveling can be possible by applying a method of hardening a composite resin compound made from a thermosetting resin with heat to fibers; the inventors completed the present invention based on the above.

A resin composition for preventing fibers from unraveling according to the present invention, which achieves the goal above, comprises:
  ethyl acrylate;
  poly acrylic Amide;
  poly urethane;

methyl acrylate;
formaldehyde;
antistatic agent; quaternary ammonium; maleic anhydride, and surfactant.

Preferably, the thermosetting resin composition comprises:
from about 20 weight % to about 30 weight % of the ethyl acrylate;
from about 30 weight % to about 40 weight % of the poly acrylic amide;
from about 15 weight % to about 16 weight % of the poly urethane;
from about 13 weight % to about 32 weight % of the methyl acrylate;
from about 2 weight % to about 3 weight % of the formaldehyde;
from about 0.3 owf % to about 0.5 owf % of the antistatic agent; from about 0.1 owf % to about 0.3 owf % of the quaternary ammonium; from about 0.05 owf % to about 0.1 owf % of the maleic anhydride, and from about 0.2 owf % to about 0.3 owf % of the surfactant.

It was found that the 0.5 owf % or more of the antistatic agent causes migration phenomenon and deteriorates the antistatic effect.

It was found that this phenomenon occurs differently in synthetic fibers and natural fibers. When the natural fibers had static electricity, the result was totally different. However, the antistatic agent of the present invention applies to synthetic fibers.

When the resin composition comprises less than about 20 weight % of the ethyl acrylate content, adhesive effect of it is significantly degraded. When the resin composition comprises more than about 30 weight % of the ethyl acrylate content, texture of it may be too hard or too firm.

In addition, when the resin composition comprises less than about 30 weight % of the poly acrylic amide content, adhesive effect of it is significantly degraded. When the resin composition comprises more than about 40 weight % of the ethyl acrylate content, texture of it may be too hard or too firm. When the resin composition comprises less than about 15 weight % of the poly urethane content, adhesive effect of it is significantly degraded. When the resin composition comprises more than about 16 weight % of the poly urethane content, texture of it may be too hard or too firm.

When the resin composition comprises less than about 13 weight % of the methyl acrylate content, adhesive effect of it is significantly degraded. When the resin composition comprises more than about 32 weight % of the methyl acrylate content, texture of it may be too hard or too firm.

When the resin composition comprises less than about 2 weight % of the formaldehyde content, adhesive effect of it is significantly degraded. When the resin composition comprises more than about 3 weight % of the formaldehyde content, texture of it may be too hard or too firm.

According to the present invention, the antistatic agent is nonionic polyethylene glycol Ester, or poly urethane polymer and ethyl acetate.

Preferably, from about 0.3 owf % to about 0.5 owf % of the antistatic agent is blended into a resin composition. It was found that when less than about 0.3 owf % of the antistatic agent content was blended into the resin composition, antistatic effect of it was significantly degraded. When more than about 0.5 weight % of the antistatic agent content was blended into the resin composition, migration was occurred, and antistatic property was degraded.

According to the present invention, from about 0.1 owf % to about 0.2 owf % of quaternary ammonium is blended into a resin composition. The quaternary ammonium comprises about 30 owf % of the Cationic Amine based on total weight of the quaternary ammonium, about 20 weight % of cation, about 12 weight % of ethylene oxide Tween, about 38 weight % of Antistatic (E.I. Du Pont de Nemours). The quaternary ammonium has antistatic property; as cationic surfactant, the quaternary ammonium converts hydrophobic substance into hydrophile substance through hydrolysis. Preferably, from about 0.3 owf % to about 0.5 owf % of the quaternary ammonium is blended into a resin composition. It was found that when less than about 0.3 owf % of the quaternary ammonium was blended into the resin composition, antistatic effect of it was not clearly seen. When the more than about 0.5 owf % of the quaternary ammonium was blended into the resin composition, antistatic effect of it was degraded.

According to the present invention, the maleic anhydride easily dissolves in water as inorganic compound and help fiber material to absorb water through providing hydrophile property to the fiber material. Preferably, from about 0.3 owf % to about 0.4 owf % of the maleic anhydride is blended into a resin composition. When less than about 0.3 owf % of the maleic anhydride was blended into the resin composition, adhesive effect of it is significantly degraded. When more than about 0.4 owf % of the maleic anhydride was blended into the resin composition, textile of it was too hard or too firm.

According to the present invention, preferably the surfactant is nonionic compound. The surfactant is Dedecyl Trimethyl Chloride made with Cationic surfactant, which was found as an appropriate surfactant in the present invention. It was found that the surfactant in the present invention has continuous sterilizing capacity, good emulsifying capacity, and high antistatic property. In addition, as the surfactant has high chemical and mechanical stability and is a compound consisting of hydrophobic and hydrophile parts, it was shown that the surfactant has good emulsifying capacity and sterilizing capacity. Specially, the surfactant can be used in from about 5 to about 9 range on the PH, which was found that the surfactant is appropriate to the present invention. The content of the surfactant is from about 0.2 owf % to about 0.3 owf %.

The thermosetting resin composition made as mentioned above according to the present invention can provide a resin composition having properties of from about 80,000 to about 120,000 cps of viscosity at $(30 \pm 1)°$ C., from about 34% to about 52% of solid content, from about 5 $kgf/cm^2$ to about 20 $kgf/cm^2$ of 100% modulus, from about 100 $kgf/cm^2$ to about 500 $kgf/cm^2$ of tensile strength, and from about 800% to about 2,000% of elongation.

Hereafter, the present invention will be described in more detail with reference to the accompanying drawings.

The graphs of the accompanying drawings described below shows test results which were performed with a resin composition as a sample, which was made based on the description above according to the present invention. The test results in the accompanying drawings are preferable embodiments, and the present invention is not limited to the test results in the accompanying drawings. The present invention includes many modifications which can be made by an ordinary person skilled in the art within scopes of appended claims.

FIG. 1 is a graph showing the test results of thermosetting phenomenon by tenter dryer temperature and heat of a resin composition according to one embodiment of the present invention. Generally, a thermosetting resin is likely to be hard when heat treatment. In order to control the hardness, the test was performed to know surface hardness of the resin composition according to heat range. The graph in FIG. 1 is the test result of the variation of the surface hardness of the resin composition according to heat range. A heat tenter dryer was used for curing when heat-setting. The variations of the hardness were shown as two aspects. It was found that the first was the variation of hardness according to a concentration of a resin composition and the second was the variation of hardness according to temperature when heat treatment.

As shown in FIG. 1, hardening phenomenon according to temperature regularly increases; however, when the temperature was over 230° C., carbonization was partially occurred, and melting phenomenon was occurred in some parts.

Figure 2:
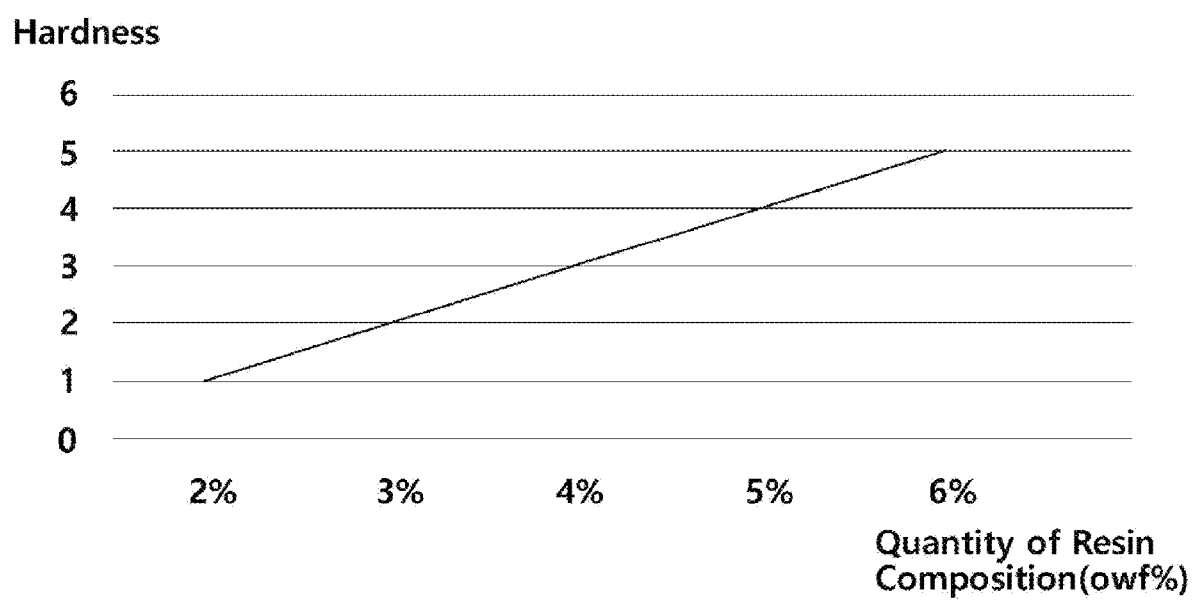
FIG. 2 is a graph showing a correlation between the quantity of a resin composition and hardness according to one embodiment of the present invention.

FIG. 2 is a graph showing a correlation between the quantity of a resin composition and hardness according to one embodiment of the present invention. The results show that the quantity of a resin composition provided in the present invention is appropriate when it is from about 3 owf % (on the weight of fiber) to about 5 owf %.

Specifically, the experiment was performed by increasing a concentration of the resin composition with a fixed heat treatment time and a fixed heat temperature under the same other conditions.

Figure 3:
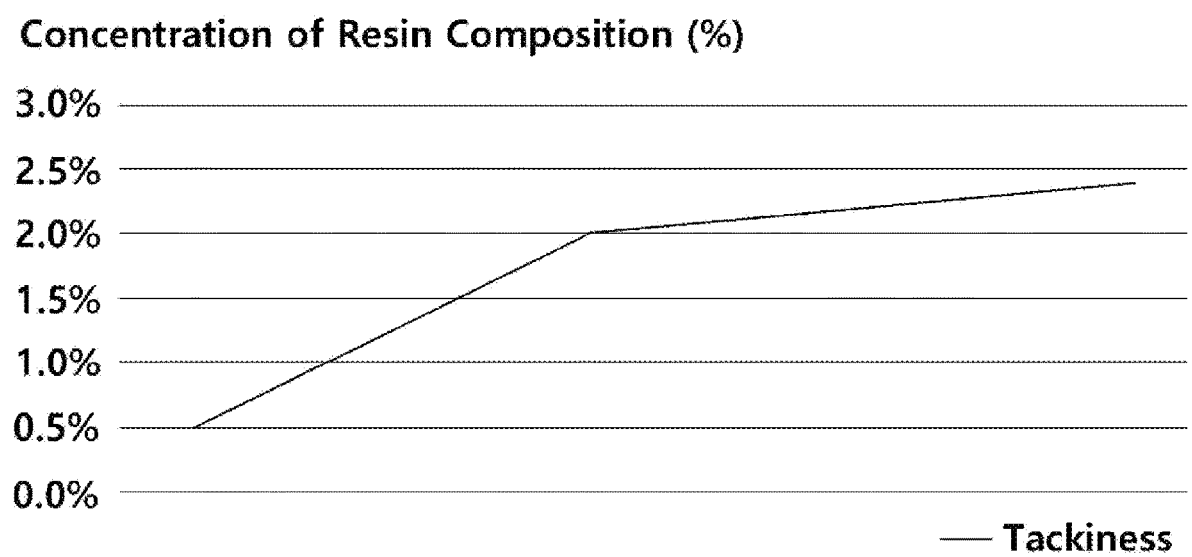
FIG. 3 is a graph showing a relation between the concentration of a resin composition and tackiness, a degree of how much threads are not unraveled, according to one embodiment of the present invention.

FIG. 3 is a graph showing a relation between the concentration of a resin composition and a tackiness, a degree of how much threads are not unraveled, according to one embodiment of the present invention. The experiment was performed by increasing temperature with a constant concentration of a resin composition. The experiment showed the test result as below.

Figure 4:
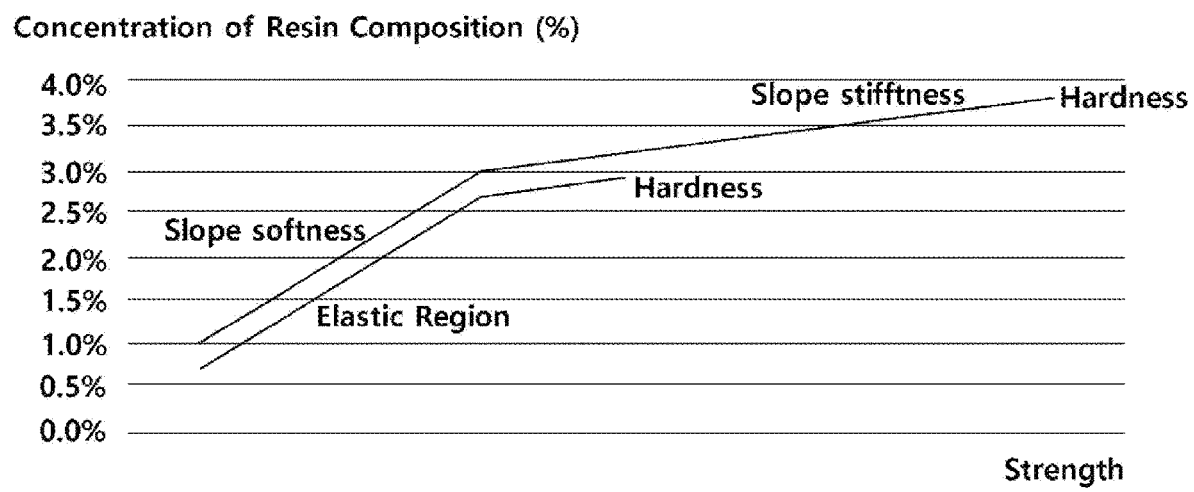
FIGS. 4 and 5 are a graph showing a correlation between the concentration of a resin composition and hardness according to one embodiment of the present invention.
Figure 5:
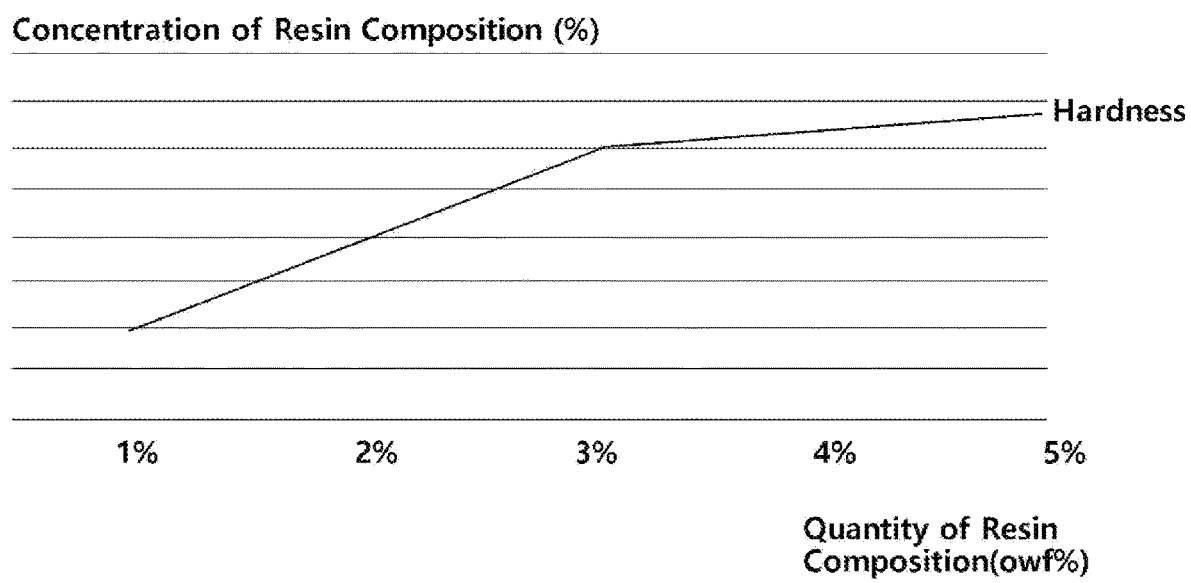

FIGS. 4 and 5 are a graph showing a correlation between the concentration of a resin composition and hardness according to one embodiment of the present invention. It was found that an amount of coating substance is appropriate in from about 60% to about 70% based on a maximum of softness, a softened state, not a peak of a elastic region.

As described above, it was found in the present invention that stabilization of a resin composition and especially, a heat treatment are important to embody a right design using a proper compound.

What is claimed is:

1. A resin composition for preventing fibers from unraveling comprising:
    from 20 weight % to 30 weight % of ethyl acrylate;
    from 30 weight % to 40 weight % of poly acrylic amide;
    from 15 weight % to 16 weight % of poly urethane;
    from 13 weight % to 32 weight % of methyl acrylate;
    from 2 weight % to 3 weight % of formaldehyde;
    from 0.3 weight % to 0.5 weight % of antistatic agent;
    from 0.3 weight % to 0.4 weight % of quaternary ammonium;
    from 0.3 weight % to 0.4 weight % of maleic anhydride, and
    from 0.2 weight % to 0.3 weight % of surfactant.

2. The resin composition according to claim 1, wherein the antistatic agent is polyethylene glycol Ester.

* * * * *